US010991179B2

(12) United States Patent
Tsukamoto et al.

(10) Patent No.: US 10,991,179 B2
(45) Date of Patent: Apr. 27, 2021

(54) ABNORMALITY NOTIFYING APPARATUS, VEHICLE, ABNORMALITY NOTIFYING METHOD, AND NON- TRANSITORY RECORDING MEDIUM

(71) Applicant: PANASONIC INTELLECTUAL PROPERTY MANAGEMENT CO., LTD., Osaka (JP)

(72) Inventors: Yoshihiro Tsukamoto, Kanagawa (JP); Hideki Tamura, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 31 days.

(21) Appl. No.: 16/365,276

(22) Filed: Mar. 26, 2019

(65) Prior Publication Data

US 2019/0304215 A1 Oct. 3, 2019

(30) Foreign Application Priority Data

Mar. 28, 2018 (JP) .............................. JP2018-062868

(51) Int. Cl.
*G07C 5/08* (2006.01)
*B60Q 1/50* (2006.01)
*B60Q 5/00* (2006.01)

(52) U.S. Cl.
CPC ............ *G07C 5/0833* (2013.01); *B60Q 1/50* (2013.01); *B60Q 5/005* (2013.01); *G07C 5/0825* (2013.01)

(58) Field of Classification Search
None
See application file for complete search history.

(56) References Cited

U.S. PATENT DOCUMENTS

| | | | | |
|---|---|---|---|---|
| 5,798,691 A | * | 8/1998 | Tim Kao | B60Q 1/442 340/479 |
| 7,069,146 B2 | * | 6/2006 | Yamamura | B60K 26/021 340/436 |
| 8,537,030 B2 | * | 9/2013 | Perkins | B60Q 1/506 340/425.5 |
| 8,954,252 B1 | * | 2/2015 | Urmson | G08G 1/166 180/167 |
| 9,030,320 B2 | * | 5/2015 | Reinpoldt | G08B 13/2494 340/517 |

(Continued)

FOREIGN PATENT DOCUMENTS

JP  2014-046838  3/2014

*Primary Examiner* — Muhammad Adnan
(74) *Attorney, Agent, or Firm* — Greenblum & Bernstein, P.L.C.

(57) ABSTRACT

Safety around a vehicle can be improved when there is a disagreement between an operation state of the vehicle and the notification contents notified from the vehicle. Abnormality notifying apparatus includes a determiner that determines whether or not there is a disagreement in correspondence relationship between operation control and notification control based on a first signal related to the operation control of vehicle and a second signal related to the notification control for notifying notification information according to the operation control to outside vehicle. When there is a disagreement in correspondence relationship, abnormality notifying apparatus notifies information indicating that the vehicle is in an abnormal state to outside vehicle.

18 Claims, 10 Drawing Sheets

(56) References Cited

U.S. PATENT DOCUMENTS

| | | | |
|---|---|---|---|
| 9,211,837 B2* | 12/2015 | Lettstrom | B60Q 1/0035 |
| 9,459,623 B1* | 10/2016 | Raghu | G05D 1/0088 |
| 10,464,473 B2* | 11/2019 | Zhang | B60W 50/14 |
| 10,591,313 B2* | 3/2020 | Kuper | H04W 4/40 |
| 10,676,023 B2* | 6/2020 | Tatara | B60Q 1/0408 |
| 2005/0187713 A1* | 8/2005 | Yamamura | B62D 15/029 |
| | | | 701/301 |
| 2011/0199199 A1* | 8/2011 | Perkins | B60Q 9/008 |
| | | | 340/435 |
| 2012/0235807 A1* | 9/2012 | Rysenga | B60C 23/0416 |
| | | | 340/445 |
| 2014/0035740 A1* | 2/2014 | Lettstrom | B60Q 1/442 |
| | | | 340/479 |
| 2014/0062685 A1* | 3/2014 | Tamatsu | B60Q 5/005 |
| | | | 340/425.5 |
| 2014/0240118 A1* | 8/2014 | Lee | B60Q 5/008 |
| | | | 340/463 |
| 2014/0277903 A1* | 9/2014 | Hauschild | B60K 37/06 |
| | | | 701/29.1 |
| 2015/0228195 A1* | 8/2015 | Beaurepaire | B60Q 1/50 |
| | | | 340/907 |
| 2015/0258928 A1* | 9/2015 | Goto | B60Q 1/24 |
| | | | 701/49 |
| 2015/0339589 A1* | 11/2015 | Fisher | G06K 9/00805 |
| | | | 706/12 |
| 2016/0223363 A1* | 8/2016 | Fujita | G01D 5/24461 |
| 2017/0057510 A1* | 3/2017 | Herbach | B62D 15/0265 |
| 2018/0151074 A1* | 5/2018 | Noto | B60W 10/18 |
| 2018/0170374 A1* | 6/2018 | Otsuka | B60W 30/0956 |
| 2018/0286245 A1* | 10/2018 | Obaidi | G08G 1/096775 |
| 2018/0350233 A1* | 12/2018 | Moreno-Lahore | G08G 1/04 |
| 2018/0357493 A1* | 12/2018 | Takamatsu | B60R 21/00 |
| 2019/0049940 A1* | 2/2019 | Shoji | G05B 23/0286 |
| 2019/0101410 A1* | 4/2019 | Kuper | H04W 4/70 |
| 2019/0107835 A1* | 4/2019 | Hashimoto | B60W 50/14 |
| 2019/0304215 A1* | 10/2019 | Tsukamoto | G07C 5/008 |
| 2020/0086891 A1* | 3/2020 | Maeng | G06F 3/1423 |

\* cited by examiner

FIG. 9

550: STATE DETERMINATION TABLE

| | | ACCELERATING/ TRAVELING | TURNING LEFT/ TURNING RIGHT | DECELERATING | STOPPING |
|---|---|---|---|---|---|
| TRAVELING CONTROL INFORMATION | ACCELERATION VALUE | a1~a2 | a3~a4 | 0~a5 | 0 |
| | BRAKE VALUE | 0 | 0~b1 | b2~b3 | b4~b5 |
| | STEERING VALUE | Don't care | s1~s2 | Don't care | Don't care |
| NOTIFIER CONTROL INFORMATION | NOTIFICATION CONTENTS | WAIT FOR TRAVERSE SIGN EXAMPLE: DO NOT TRAVERSE BECAUSE VEHICLE IS TRAVELING | VEHICLE WAITING SIGN EXAMPLE: VEHICLE IS WAITING UNTIL YOU FINISH TRAVERSING | INDICATION FOR NOTICE OF STOP ANNOUNCEMENT EXAMPLE: WAIT UNTIL VEHICLE STOPS | INDICATION FOR NOTICE OF TRAVERSE POSSIBLE EXAMPLE: TRAVERSE |

ABNORMALITY NOTIFYING APPARATUS, VEHICLE, ABNORMALITY NOTIFYING METHOD, AND NON- TRANSITORY RECORDING MEDIUM

TECHNICAL FIELD

This disclosure relates to an abnormality notifying apparatus, a vehicle, an abnormality notifying method, and a non-transitory recording medium.

BACKGROUND ART

There is a technique for notifying a pedestrian recognized by a vehicle that the pedestrian is recognized by the vehicle, or for displaying sign that can guide the pedestrian (see, for example, PTL 1 below).

CITATION LIST

Patent Literature

PTL 1
Japanese Patent Application Laid-Open No. 2014-46838

SUMMARY OF INVENTION

Technical Problem

However, in the related art, enough consideration is not made for occurrence of a disagreement between an operating state of a vehicle, such as traveling, decelerating or stopping, and notification contents from the vehicle to the pedestrian.

Non-limiting examples of this disclosure contribute to an abnormality notifying apparatus, a vehicle, an abnormality notifying method, and a program, which can improve safety around the vehicle when there is a disagreement between the operating state of the vehicle and the notification contents notified from the vehicle.

Solution to Problem

An abnormality notifying apparatus according to one aspect of the present disclosure includes: a determiner that determines whether or not there is a disagreement in correspondence relationship between operation control and notification control based on a first signal related to the operation control of a vehicle and a second signal related to the notification control for notifying notification information according to the operation control to outside the vehicle; and a notifier that notifies information indicating that the vehicle is in an abnormal state to outside the vehicle when there is a disagreement in correspondence relationship.

Also, a vehicle according to one aspect of this disclosure includes the abnormality notifying apparatus described above.

An abnormality notifying method according to one aspect of the present disclosure includes: determining whether or not there is a disagreement in correspondence relationship between operation control and notification control based on a first signal related to the operation control of a vehicle and a second signal related to the notification control for notifying notification information according to the operation control to outside the vehicle; and notifying information indicating that the vehicle is in an abnormal state to outside the vehicle when there is a disagreement in the correspondence relationship.

A non-transitory recording medium according to one aspect of the present disclosure is a recording medium recording therein a program causing a computer to execute processing including: determining whether or not there is a disagreement in correspondence relationship between operation control and notification control based on a first signal related to the operation control of a vehicle and a second signal related to the notification control for notifying notification information according to the operation control to outside the vehicle; and notifying information indicating that the vehicle is in an abnormal state to outside the vehicle when there is a disagreement in the correspondence relationship.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

Advantageous Effects of Invention

According to one aspect of this disclosure, the safety around the vehicle when there is a disagreement between an operating state of a vehicle and the notification contents notified from the vehicle can be improved.

Further advantages and effects in one aspect of this disclosure will be apparent from the specification and the drawings. While such advantages and/or effects are respectively provided by several embodiments and characteristics described in the specification and the drawings, all of these do not necessarily have to be provided for achieving one or more of the identical characteristics.

BRIEF DESCRIPTION OF DRAWINGS

FIG. 9 is a diagram illustrating an example of a state determination table according to Embodiment 2;

DESCRIPTION OF EMBODIMENTS

Figure 1:
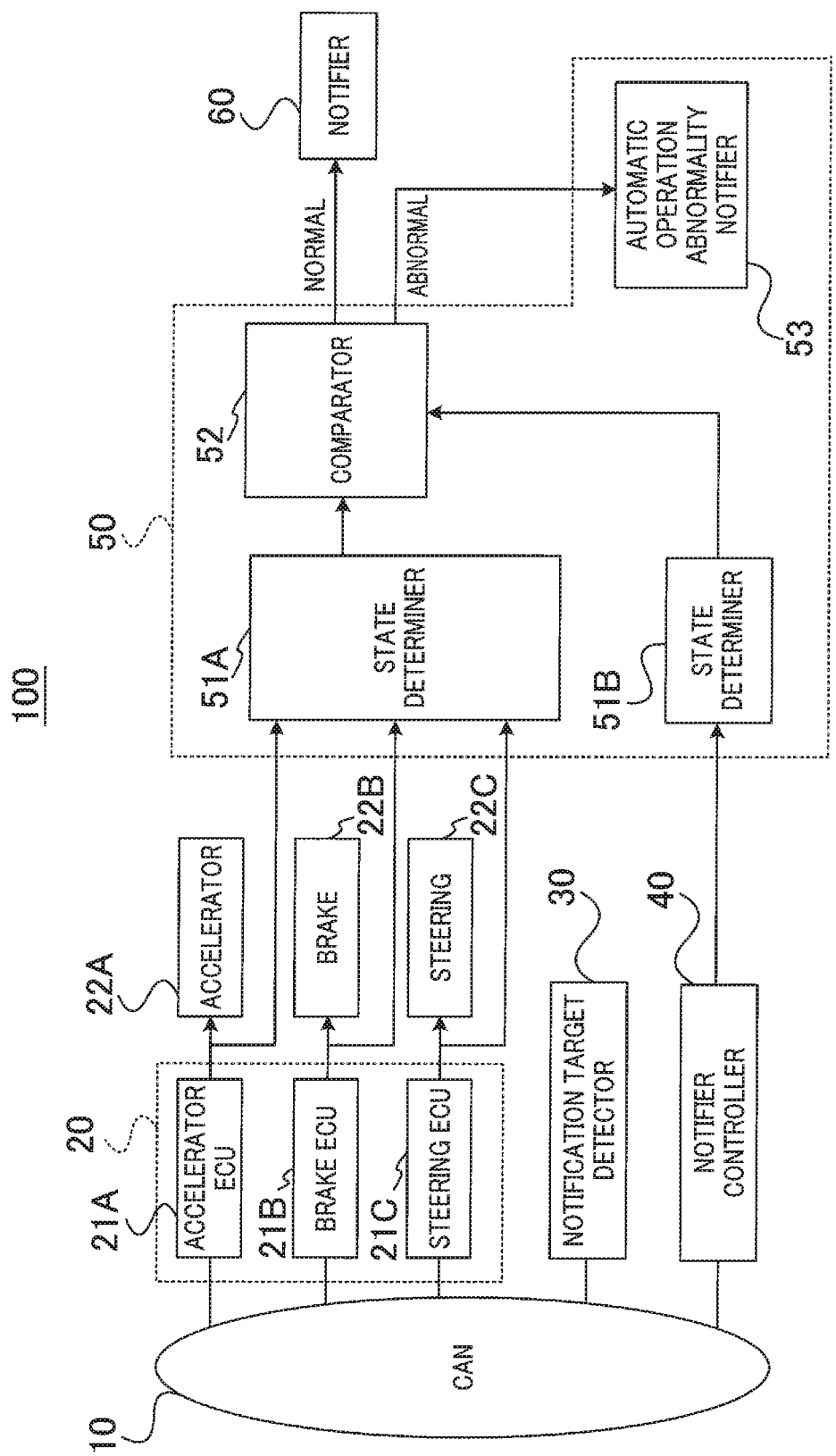
FIG. 1 is a block diagram illustrating an example of a configuration of a vehicle equipped with an abnormality notifying apparatus according to Embodiment 1.

Referring now to the drawings as appropriate, embodiments of the invention will be described in detail below.

However, explanation detailed more than necessary may be omitted. For example, a detailed description of well-known matters and redundant explanation on substantially the same configuration may be omitted. This is to avoid the unnecessary redundancy of the following description and to facilitate understanding by those skilled in the art.

It is to be noted that the accompanying drawings and the following description are provided to enable those skilled in the art to fully understand this disclosure, and are not intended to limit the claimed subject.

Embodiment 1

FIG. 1 is a block diagram illustrating an example of a configuration of vehicle 100 equipped with abnormality notifying apparatus 50 according to Embodiment 1.

Vehicle 100 may be any of, for example, a gasoline vehicle, a diesel vehicle, a hybrid vehicle (which may include a plug-in hybrid vehicle), an electric automobile, or a fuel cell vehicle. Vehicle 100 may be equipped with an operation control apparatus or an operation control system for achieving driving equivalent to any of autonomous driving levels 0, 1, 2, 3, 4, and 5, for example.

Vehicle 100 illustrated in FIG. 1 illustratively includes CAN 10, accelerator ECU 21A, brake ECU 21B, steering ECU 21C, accelerator 22A, brake 22B, steering 22C, notification target detector 30, notifier controller 40, abnormality notifying apparatus 50, and notifier 60 may be provided.

Accelerator ECU 21A, brake ECU 21B, and steering ECU 21C constitute drive controller 20 of vehicle 100. Note that "CAN" is an abbreviation for "Controller Area Network", and "ECU" is an abbreviation for "Electronic Control Unit". In addition, accelerator ECU 21A, brake ECU 21B, and steering ECU 21C are sometimes abbreviated as ECU 21A, ECU 21B, and ECU 21C, respectively.

CAN 10 is an example of an in-vehicle network that supports mutual communication (for example, bus communication) between onboard devices. For example, as illustrated in FIG. 1, drive controller 20, notification target detector 30, and notifier controller 40 are connected to CAN 10. Therefore, drive controller 20, notification target detector 30, and notifier controller 40 can mutually communicate via CAN 10.

Drive controller 20 electronically controls the travel of vehicle 100 in response to a driving operation (for example, accelerator operation, brake operation, and/or steering operation) by a driver or the operation control system of vehicle 100, for example.

For example, a signal corresponding to the accelerator operation by the driver or the operation control system is given to accelerator ECU 21A, whereby accelerator ECU 21A electronically controls accelerator 22A of vehicle 100 (in other words, the acceleration of vehicle 100).

Further, a signal corresponding to the brake operation by the driver or the operation control system is given to brake ECU 21B, so that brake ECU 21B electronically controls brake 22B of vehicle 100 (in other words, deceleration of vehicle 100).

Further, a signal corresponding to the steering operation by the driver or the operation control system is given to steering ECU 21C, so that steering ECU 21C electronically controls steering 22C of vehicle 100 (in other words, the traveling direction of the vehicle 100).

Notification target detector 30 detects, for example, a target (notification target; for example, a passer such as a pedestrian) using a sensor and/or a radar device to inform that vehicle 100 exists or approaches.

When a notification target is detected, for example, by notification target detector 30, notifier controller 40 controls notification to the notification target by notifier 60 via abnormality notifying apparatus 50.

To notify a notification target by notifier 60, display by projection using visible light may illustratively be used. For example, information indicating that vehicle 100 is detecting a passer and/or information indicating operation control (or behavior) that vehicle 100 can take after the detection of the passer in relation to the relationship with the detected passer may be displayed by projection using visible light. For example, information indicating that vehicle 100 is decelerating and stopping may be displayed for a passer by projection using visible light.

Also, for example, information that guides a behavior of a passer in relation to vehicle 100 may be displayed by projection using visible light. For example, vehicle 100 can prompt (guide or suggest) a passer in front of vehicle 100 by projecting "crosswalk" with visible light in front of the passer by notifier 60.

For information display by projection of visible light as described above, notifier 60 may be provided with one or a plurality of visible light sources (not illustrated). The information projected by the visible light may be at least one of a character, a figure, a still image, and a moving image.

It should be noted that notifier 60 that performs information display by projection with visible light may be referred to as "display machine 60" for the sake of convenience and the notifier controller 40 may be referred to as "display controller 40" for the sake of convenience.

Abnormality notifying apparatus 50 confirms (or determine) correspondence relationship between the operation control and the notification control (whether there is a disagreement or not), for example, based on a signal related to the operation control for vehicle 100 and a signal related to control (notification control) for the notifier 60 by notifier controller 40 according to the operation control.

The signal related to the operation control for vehicle 100 is, for example, a control signal that drive controller 20 outputs to a control target (for example, at least one of accelerator 22A, brake 22B, and steering 22C). Further, the signal related to the operation control for vehicle 100 may be a signal (in other words, a sensor value) of a sensor (described later) that senses a physical quantity of the control target, for example, by drive controller 20.

For example, abnormality notifying apparatus 50 determines whether or not there is a disagreement between the operation control for vehicle 100 and the notification control for notifier 60, and when there is a disagreement, abnormality notifying apparatus 50 determines that vehicle 100 is in an abnormal state. When vehicle 100 is determined to be in an abnormal state, abnormality notifying apparatus 50 notifies, for example, the notification target of information indicating that vehicle 100 is in an abnormal state.

Information indicating that vehicle 100 is in an abnormal state may be referred to simply as "abnormal state information". For example, the abnormal state information may be information for issuing an alert according to the abnormal state occurring in vehicle 100 to the notification target, or may be information for encouraging the notification target to watch out or to keep head up according to the abnormal state occurring in vehicle 100. The information for issuing an alert, encouraging the notification target to watch out or to keep head up may be collectively referred to as "alert information" for the sake of convenience. In addition, notification of abnormal state information may be referred to simply as "abnormality notification" for the sake of convenience.

In order to perform abnormality notification, abnormality notifying apparatus 50 may include, for example, state determiner 51A, state determiner 51B, comparator 52, and automatic operation abnormality notifier 53 as illustrated in FIG. 1.

State determiner 51A determines the operating state of vehicle 100 based on, for example, a drive control signal (hereinafter also referred to as "operation control signal" or "travel control signal") output from drive controller 20. The term "determination" may be replaced with other terms such as "judgment", "detection", "sensing", "identification", or "recognition", for example.

The operation control signal output from drive controller 20 may include, for example, an accelerator control signal, a brake control signal, and a steering control signal.

The accelerator control signal is a control signal output from accelerator ECU 21A to accelerator 22A. The brake control signal is a control signal output from brake ECU 21B to brake 22B. The steering control signal is a control signal output from steering ECU 21C to steering 22C.

Based on the values indicated by the accelerator control signal, the brake control signal, and the steering control signal, for example, an operating state indicating whether vehicle 100 is traveling, accelerating or decelerating, or turning left or right is determined.

State determiner 51B, for example, determines the notification state ("notification content") by notifier 60 based on a control signal (hereinafter, sometimes referred to as "notifier control signal") for notifier 60 output from notifier controller 40.

Comparator 52, for example, determines whether or not there is a disagreement between the operation control (or operating state) of vehicle 100 and the notification content of notifier 60 (in other words, whether or not the both have a correct correspondence relationship) by comparing a determination results of state determiners 51A and 51B.

If determination results of state determiners 51A and 51B are in agreement, comparator 52 determines that there is no abnormality (normal) and continues notification by notifier 60 by outputting, for example, a notifier control signal from notifier controller 40 to notifier 60.

If the determination results of state determiners 51A and 51B indicates that there is a disagreement, comparator 52 determines that there is an abnormality, and for example, provides automatic operation abnormality notifier 53 with a control signal for notifying (or alert) the fact that an abnormality is occurring in the automatic operation control of vehicle 100 to outside the vehicle. In that case, comparator 52 may block the notifier control signal to notifier 60. Alternatively, the comparator 52 may output a control signal for stopping notification by notifier 60 to notifier 60.

Automatic operation abnormality notifier (notifier) 53 notifies the fact that an abnormality is occurring in automatic operation control of vehicle 100 according to the control signal provided by comparator 52 (in other words, the reliability of automatic operation control of vehicle 100 is declining) to outside the vehicle.

The notification by automatic operation abnormality notifier 53 may be performed using at least one of auditory notification and visual notification, or both. For example, as with the notifier 60, the automatic operation abnormality notifier 53 may perform information display by projection using visible light. An example of the notification mode of the automatic operation abnormality notifier 53 will be described later. It should be noted that automatic operation abnormality notifier 53 and notifier 60 may be integrally configured.

<Example of Occurrence of Disagreement in Operating State>

Figure 2:
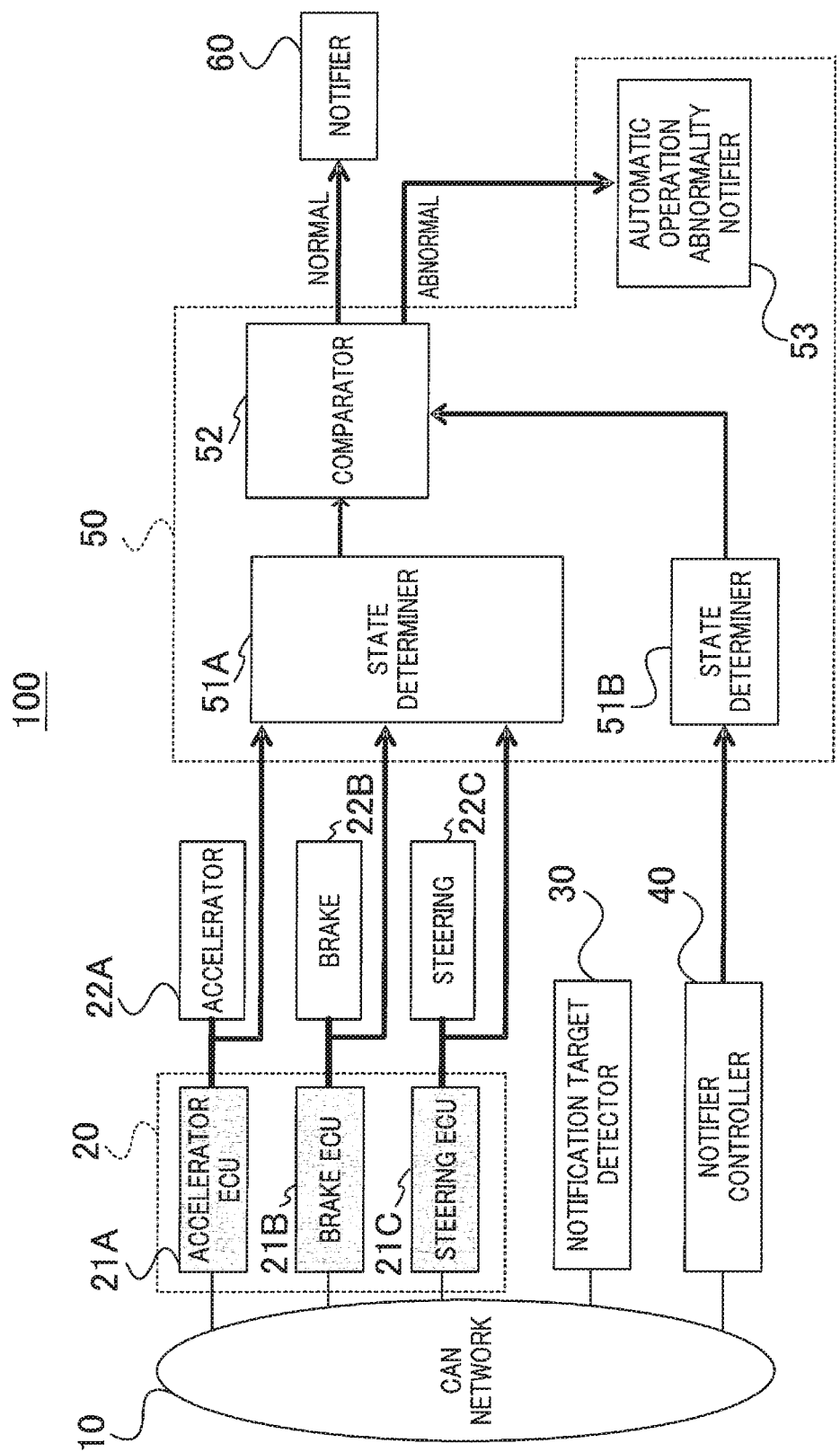
FIG. 2 is a diagram for explaining an example of a case when there arises a disagreement between operation control and notification control of the vehicle illustrated in FIG. 1.

Next, with reference to FIG. 2, an example in which there is a disagreement between the operation control of vehicle 100 performed by drive controller 20 and the notification control for notifier 60 performed by notifier controller 40 will be described.

Non-limiting examples of the occurrence of a disagreement between the operation control and the notification control include electronic unauthorized invasion (referred to as "cracking") using a computer from the outside of vehicle 100. For example, as illustrated by hatching in FIG. 2, some or all of accelerator ECU 21A, brake ECU 21B, and steering ECU 21C may be cracked via the CAN 10. For example, in a case where a TCU (telematics control unit) for communicating with the external network is connected to CAN 10, cracking can be performed from a remote place via the network.

When some or all of accelerator ECU 21A, brake ECU 21B, and steering ECU 21C are cracked, the control right for part or all of accelerator 22A, brake 22B, and steering 22C is lost. Therefore, some or all of the accelerator control signal, the brake control signal, and the steering control signal may differ from the control signal in the normal state.

On the other hand, for example, a control signal (hereinafter referred to as "notifier control signal") for notifications corresponding to an accelerator control signal, a brake control signal, and a steering control signal in a normal operating state of vehicle 100 is output from notifier controller 40 to notifier 60.

Therefore, when some or all of the accelerator control signal, the brake control signal, and the steering control signal are rewritten by cracking, there arises a disagreement between the operation control for vehicle 100 and the notification control by notifier controller 40.

For example, consideration will be made for a case where a passer target, which is an example of the notification target, is detected by notification target detector 30, and thus brake 22B is controlled by a brake control signal, and the vehicle 100 is stopped, and in response to the stop, notifier 60 provides a sign encouraging the passer to traverse the road.

In this case, for example, when accelerator ECU 21A and brake ECU 21B are controlled from the outside of vehicle 100 by cracking, an abnormality situation may occur such that vehicle 100 continues traveling without stopping, despite notifier 60 displays a sign encouraging to traverse the road.

Abnormality notifying apparatus 50 detects a disagreement between the operation control for (operating state of) vehicle 100 and the notification control (notification state) performed by notifier controller 40 according to state determiners 51A and 51B and comparator 52 on the basis of a signal associated with the operation control and a signal associated with the notification control.

The accelerator ECU 21A and the accelerator 22A, the brake ECU 21B and the brake 22B, and the steering ECU 21C and the steering 22C are connected individually and physically by electric signal lines independent of the CAN 10.

Therefore, accelerator 22A, brake 22B, and steering 22C are not targets to cracking. In other words, it is not possible to tamper with the control signal given to each of accelerator 22A, brake 22B, and steering 22C by cracking. Therefore, state determiner 51A can determine the actual operation control of vehicle 100 regardless of the presence or absence of cracking by monitoring the control signals given to accelerator 22A, brake 22B, and steering 22C, respectively.

It should be noted that abnormality notification by automatic operation abnormality notifier 53 is performed because "disagreement in state" (abnormal state) is detected in comparator 52 also when the notifier controller 40 out of the drive controller 20 and the notifier controller 40 is cracked.

Further, a disagreement between the above-mentioned operating state and notification state may occur even when any one or more of ECU 21A, ECU 21B, and ECU 21C and/or notifier controller 40 breaks down. Therefore, even when the cause of the occurrence of the disagreement in state is "breakdown", this disclosure including "Embodiment 1" and "Embodiment 2" to be described later can be applied by replacing "cracking" as "breakdown", for example.

Operation Example

An example of the operation of vehicle 100 equipped with abnormality notifying apparatus 50 described above will be described with reference to the flowchart in FIG. 3.

Figure 3:
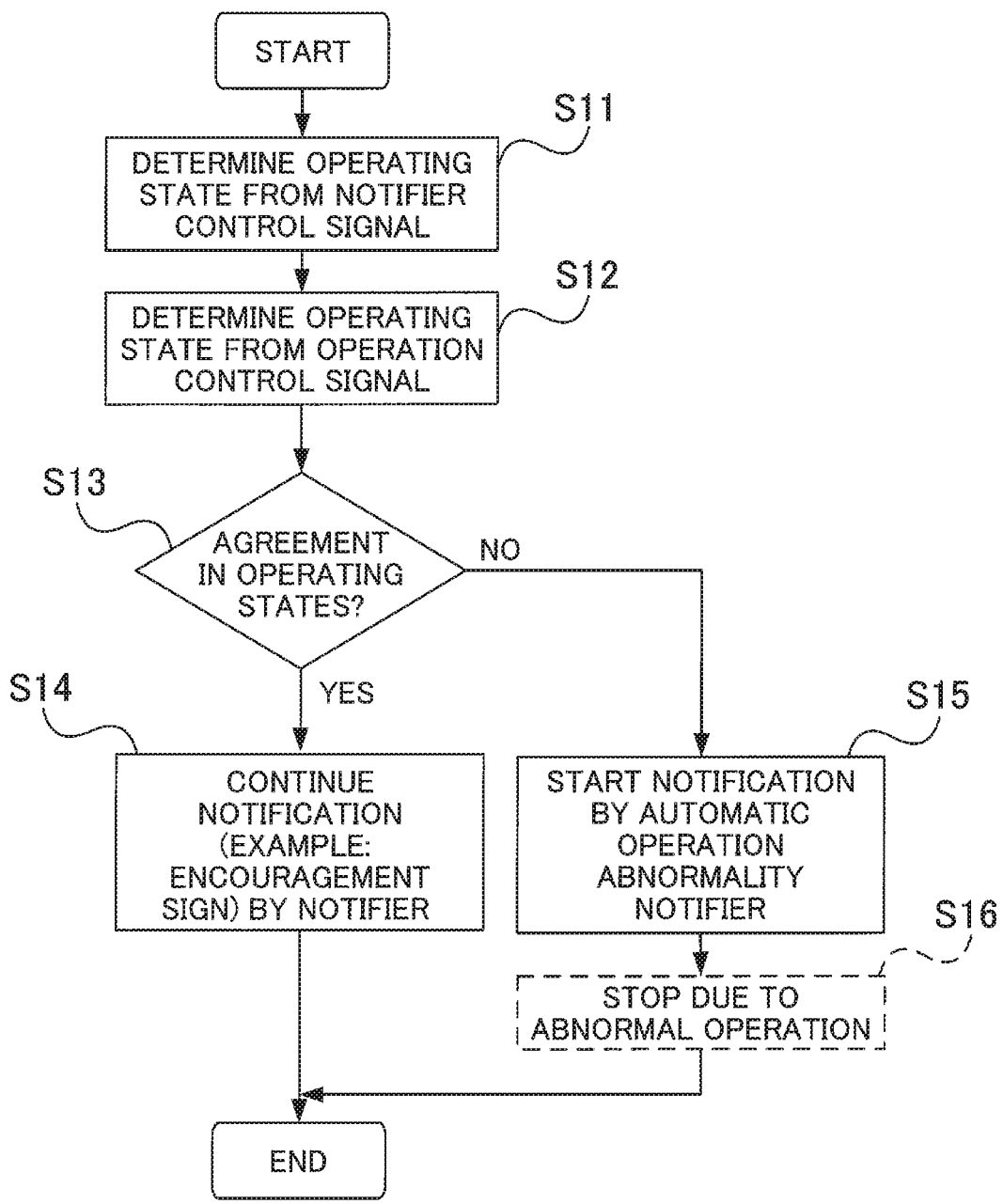
FIG. 3 is a flowchart illustrating an example of an operation of the abnormality notifying apparatus according to Embodiment 1.

As illustrated in FIG. 3, abnormality notifying apparatus 50 determines operation control of vehicle 100 corresponding to the notification state of notifier 60 by state determiner 51A based on the notifier control signal that the notifier controller 40 outputs for notifier 60 (S11).

Abnormality notifying apparatus 50 also determines operating state of vehicle 100 by state determiner 51B based on an accelerator control signal, a brake control signal, and a steering control signal that drive controller 20 (the ECU 21A, the ECU 21B, and the ECU 21C) outputs (S12).

It should be noted that the above-described determination steps S11 and S12 may be reversed in order of processing, or may be executed in parallel.

Then, abnormality notifying apparatus 50 compares determination results obtained in the determination steps S11 and S12 with each other in the comparator 52, and determines whether or not both determination results are in agreement (S13).

If both determination results are in agreement (YES in S13), comparator 52 determines that the vehicle is in a "normal" state and, for example, outputs a notifier control signal input from notifier controller 40 via state determiner 51B to notifier 60. Accordingly, notification by notifier 60 (for example, guidance display for passer) is continued (S14).

On the other hand, when there is a disagreement between the determination results obtained by the state determiners 51A and 51B (NO in S13), comparator 52 determines that the state is "abnormal" and outputs a control signal for notifying an occurrence of abnormality to outside the vehicle (for example to a passer), for example, to automatic operation abnormality notifier 53 (S15). Automatic operation abnormality notifier 53 notifies an occurrence of an abnormality in automatic operation control of vehicle 100 to outside the vehicle according to the control signal given from the comparator 52.

Accordingly, for example, the passer around vehicle 100 can recognize that an abnormality is occurring in the automatic operation control of vehicle 100, and thus can take an evasive behavior such as not approaching vehicle 100. Therefore, for example, collision between cracked vehicle 100 and the passer can be avoided and safety of the passer around vehicle 100 can be improved.

Comparator 52 may control the operating state (for example, stop control) of vehicle 100 according to abnormality notification by automatic operation abnormality notifier 53, as indicated by a dotted line in FIG. 3, for example (S16). An example of control of the operating state by comparator 52 will be described later.

<Aspects of Abnormality Notification>

Next, with reference to FIGS. 4A to 6C, several examples relating to aspects of abnormality notification will be described.

(First Aspect of Abnormality Notification; Sound of Abnormal Alarm Sound)

Figure 4C:
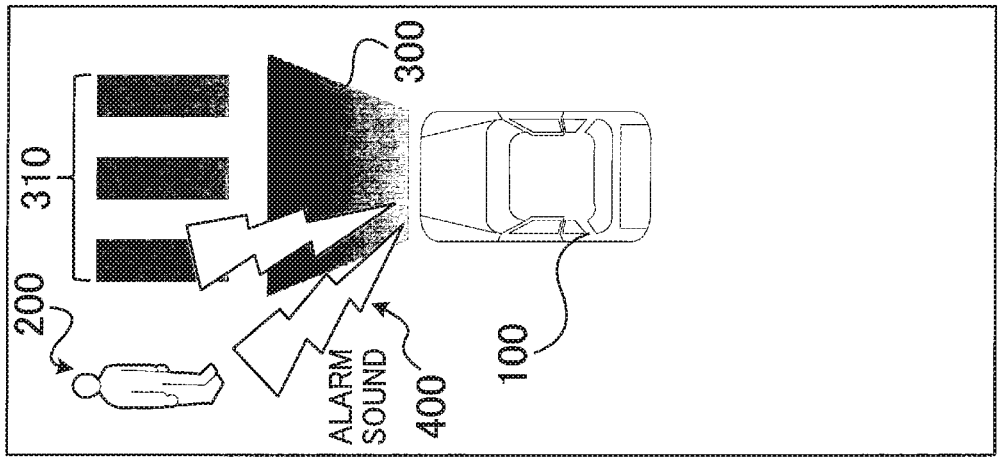
FIGS. 4A-4C are diagrams illustrating a first aspect of abnormality notification according to Embodiment 1.
Figure 4B:
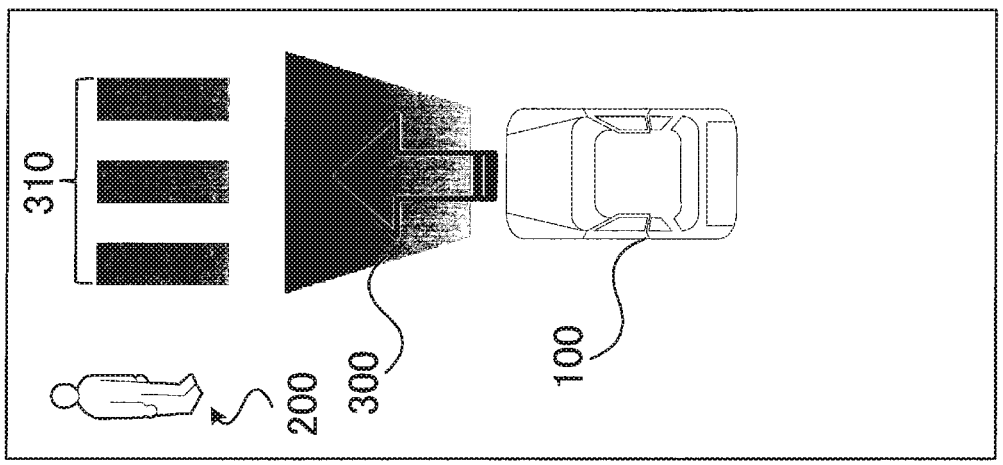
Figure 4A:
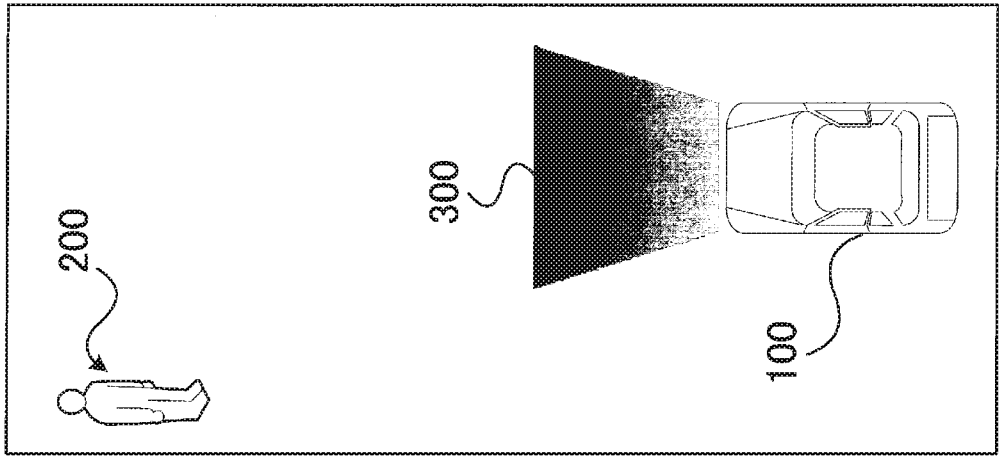

As illustrated in FIG. 4A, when passer 200 is detected by notification target detector 30 (see FIG. 1) while the vehicle 100 is travelling, vehicle 100, for example, starts display (stop sign) 300 indicating that vehicle 100 will decelerate and stop to passer 200 by notifier 60.

Vehicle 100 approaches passer 200 while maintaining stop sign 300. As illustrated in FIG. 4B, when the distance between vehicle 100 and passer 200 becomes equal to or less than a predetermined threshold value, vehicle 100 starts display sign (traverse encouraging sign) 310 for encouraging passer 200 to traverse in front of vehicle 100 by notifier 60. The fact that the distance between vehicle 100 and passer 200 becomes equal to or smaller than the threshold value is detected by notification target detector 30, for example.

Here, for example, in a case where vehicle 100 is not controlled to decelerate or stop because of cracking of accelerator ECU 21A and brake ECU 21B of vehicle 100, vehicle 100 maintains traveling while indicating stop sign 300 and traverse encouraging sign 310.

In this case, in abnormality notifying apparatus 50 of vehicle 100, comparator 52 detects a disagreement (abnormal state) between determination result of operating state based on the operation control signal and determination result of notification state based on the notifier control signal.

Therefore, for example, a control signal indicating that an abnormality occurs in automatic operation control to warn passer 200 is given from comparator 52 to automatic operation abnormality notifier 53.

In response to the control signal from the comparator 52, the automatic operation abnormality notifier 53 outputs alarm sound 400 from the outside the vehicle speaker as shown in FIG. 4C, for example. Alarm sound 400 may or may not include voice messages.

With alarm sound 400, for example, passer 200 can auditorily recognize that something is wrong with vehicle 100. Therefore, passer 200 can take an evasive behavior such as moving away from vehicle 100 without trusting stop sign 300 and traverse encouraging sign 310 from vehicle 100, for example. Therefore, for example, it is possible to prevent a collision between vehicle 100 with an abnormality occurring in the automatic operation control and passer 200, and to improve the safety of passer 200 around vehicle 100.

It should be noted that automatic operation abnormality notifier 53 may display a sign indicating that an abnormality is occurring in the automatic operation control in place of or additionally to the output of alarm sound 400. Since passer 200 can intuitively recognize that an abnormality is occurring in vehicle 100 by visual abnormality notification, improvement of abnormality notification effect can be expected.

(Second Aspect of Abnormality Notification; Signal Blocking to Notifier and Switching to Abnormal State Display)

Next, with reference to FIGS. 5A to 5C, a second aspect of abnormality notification will be described. FIGS. 5A and 5B correspond to FIGS. 4A and 4B, respectively. Operating state of vehicle 100 and the notification state according to notifier 60 shown in FIGS. 5A and 5B may be the same as those described with reference to FIGS. 4A and 4B. In other words, in the "second aspect of abnormality notification", the abnormality notification mode illustrated in FIG. 5C is different from the abnormality notification mode illustrated in FIG. 4C.

For example, when a disagreement (an abnormal state) between operating state and notification state is detected by comparator 52, comparator 52 blocks the output of notifier control signal to notifier 60. As a result, stop sign 300 and traverse encouraging sign 310 are canceled as illustrated in FIG. 5C.

In addition, comparator 52 gives a control signal to automatic operation abnormality notifier 53 to issue a warning indicating that it is dangerous because an abnormality is occurring in the automatic operation control of vehicle 100 to passer 200. In response to the control signal from the comparator 52, the automatic operation abnormality notifier 53 displays a sign (sign of occurrence of abnormality) 320 indicating that an abnormality is occurring in vehicle 100 as illustrated in FIG. 5C.

Figure 5C:
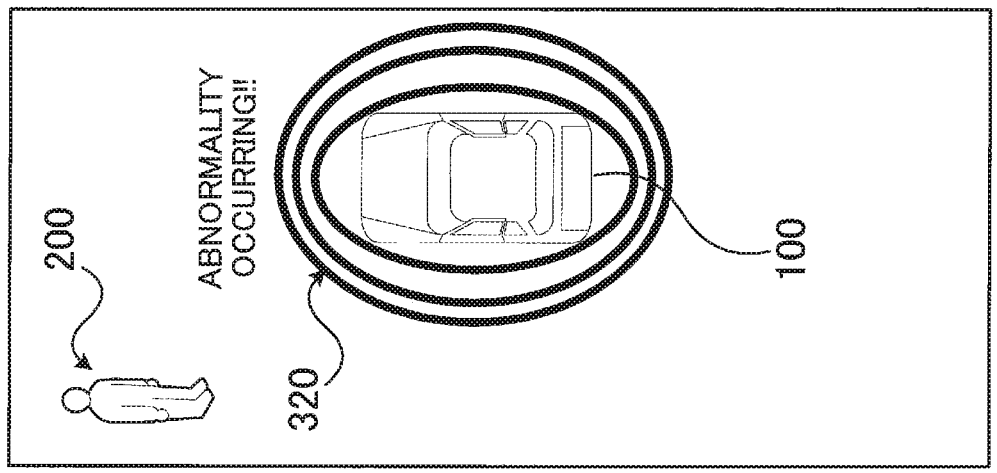
FIGS. 5A-5C are diagrams illustrating a second aspect of the abnormality notification according to embodiment 1.
Figure 5B:
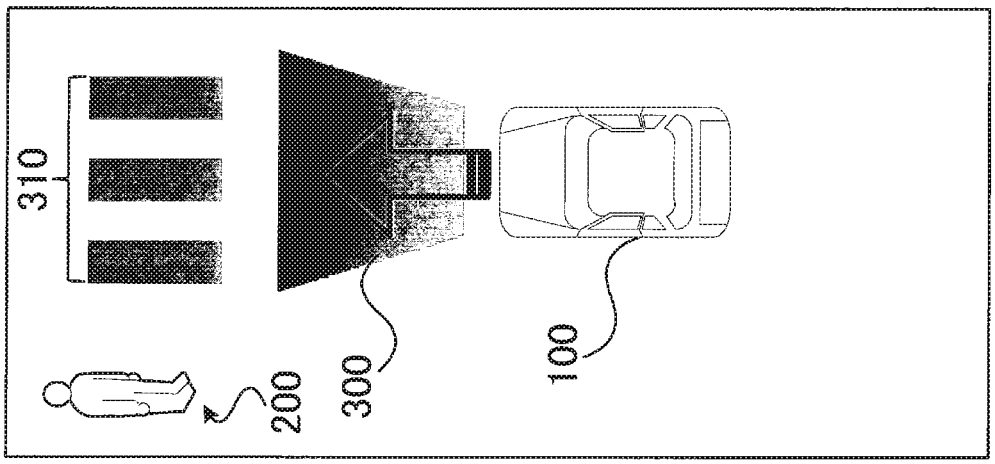
Figure 5A:
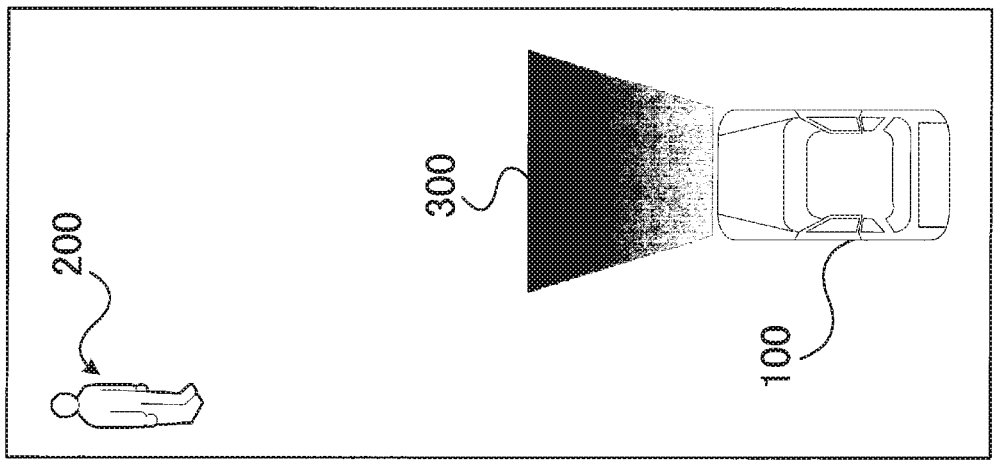

The blocking of the notifier control signal for notifier 60 and the output of the control signal for automatic operation abnormality notifier 53 switch stop sign 300 and traverse encouraging sign 310 to sign of occurrence of abnormality 320 as illustrated in FIGS. 5B and 5C.

Stop sign 300 and traverse encouraging sign 310 are aborted and switched to sign indicating an occurrence of abnormality 320. Therefore, for example, passer 200 can recognize that an abnormality is occurring in vehicle 100 without being perplexed compared with the case where stop sign 300 and traverse encouraging sign 310 are maintained.

Therefore, for example, passer 200 can quickly take evasive behavior such as moving away from vehicle 100 without hesitation. Therefore, it is possible to improve the collision prevention effect between vehicle 100 having an abnormality occurring in the automatic operation control and passer 200.

In addition to or instead of sign of occurrence of abnormality 320, output of alarm sound 400 as described in FIG. 4C may be performed. The combination of sign of occurrence of abnormality 320 and alarm sound 400 can further enhance the collision prevention effect between vehicle 100 and passer 200.

(Third Aspect of Abnormality Notification; Emergency Stop)

Figure 6C:
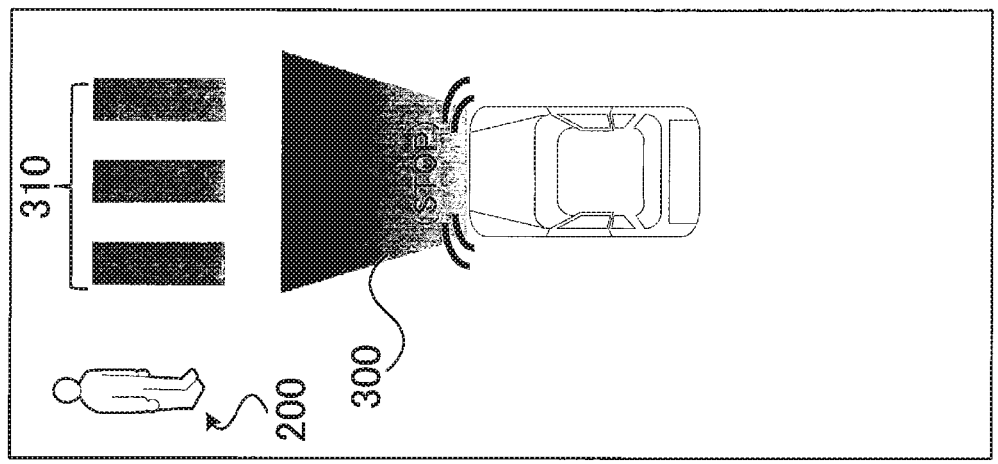
FIGS. 6A-6C are diagrams illustrating a third aspect of the abnormality notification according to Embodiment 1.
Figure 6B:
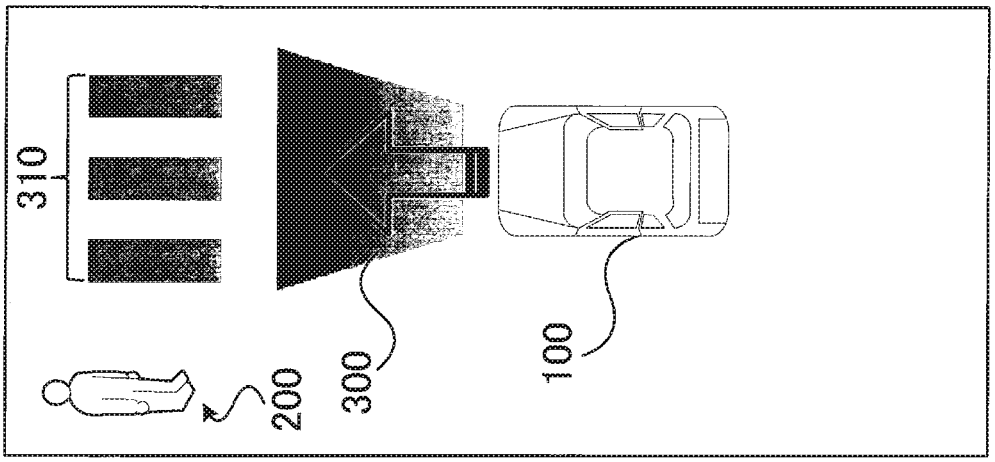
Figure 6A:
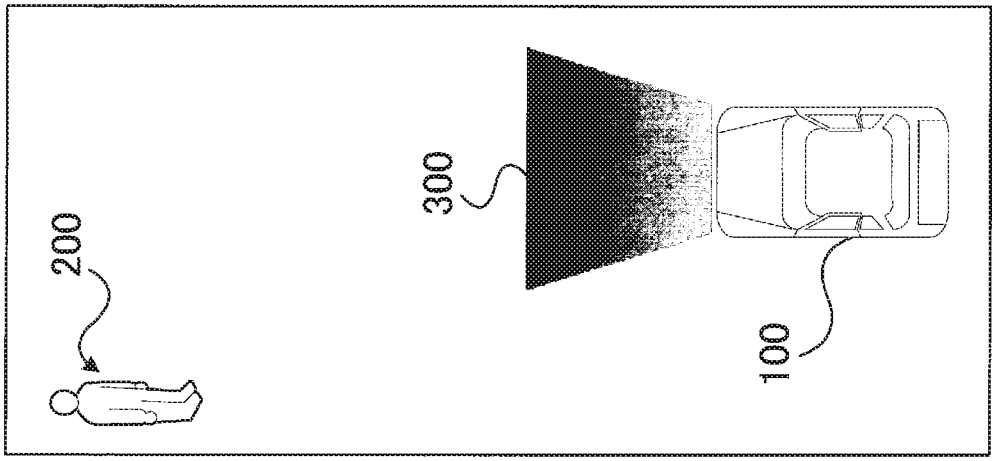

Next, with reference to FIGS. 6A to 6C, a third aspect of abnormality notification will be described. FIGS. 6A and 6B correspond to FIGS. 4A and 4B (or FIGS. 5A and 5B), respectively. The operating state of vehicle 100 and the notification state by notifier 60 illustrated in FIGS. 6A and 6B may be the same as those described in FIGS. 4A and 4B. In other words, in the "Third Aspect of abnormality notification", the abnormality notification mode illustrated in FIG. 6C is different from the abnormality notification mode illustrated in FIG. 4C (and FIG. 5C).

Figure 7:
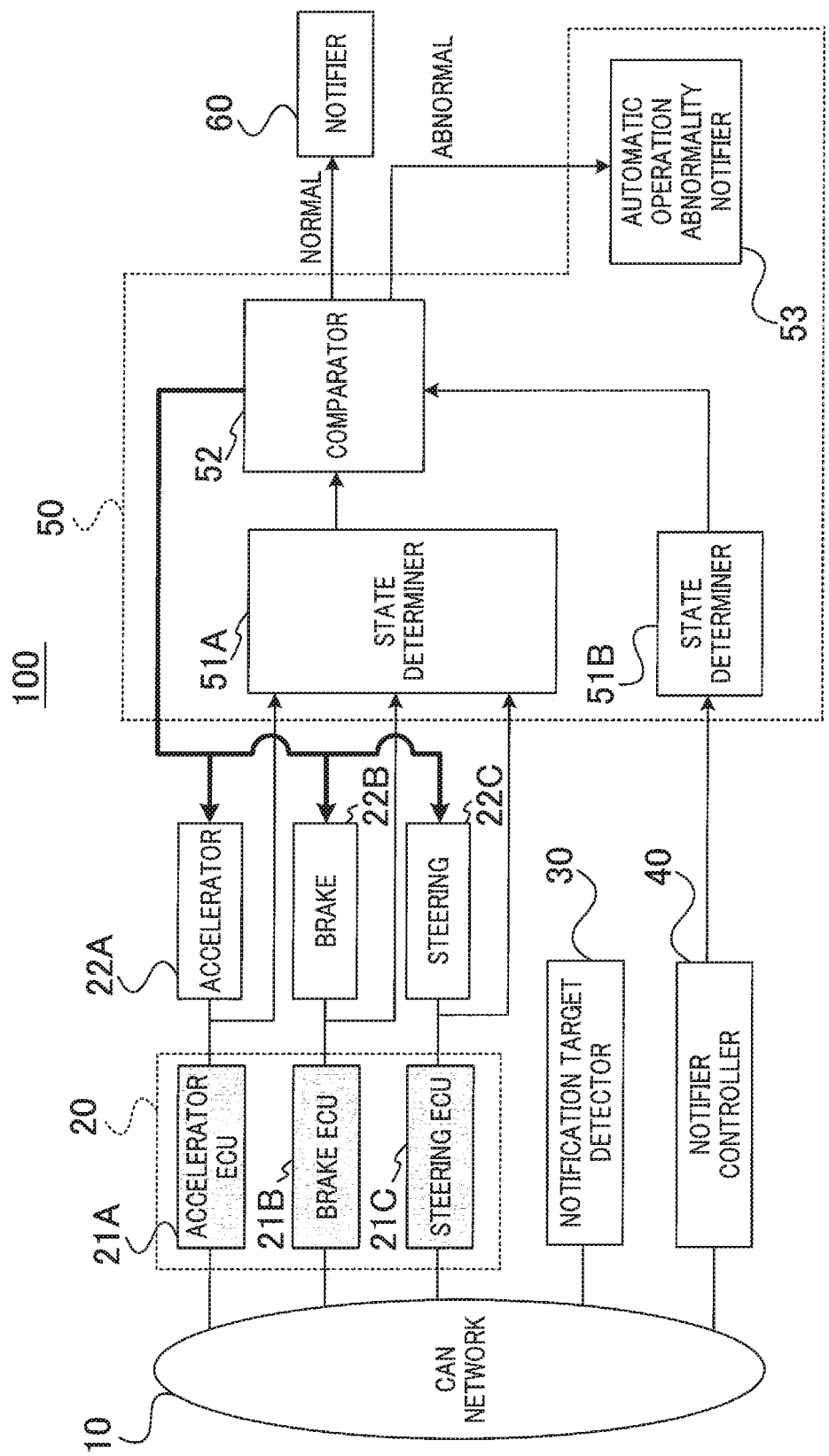
FIG. 7 is a block diagram illustrating an example of a configuration of an abnormality notifying apparatus according to the third aspect of abnormality notification.

In "Third Aspect of Abnormality Notification", as illustrated in FIG. 7, comparator 52 is electrically connected to, for example, accelerator 22A, brake 22B, and steering 22C, and can control accelerator 22A, brake 22B, and steering 22C individually. In this case, accelerator 22A, brake 22B, steering 22C prioritize a signal from comparator 52 over signals from each ECU. Therefore, comparator 52 can individually control accelerator 22A, brake 22B, and steering 22C, for example, when there is a disagreement between the operating state of vehicle 100 and the notification state performed by notifier 60.

For example, when a disagreement (abnormal state) between the operating state and the notification state is detected in comparator 52, comparator 52 stops (emergency stops) vehicle 100 by outputting a control signal to brake 22B, for example.

Therefore, for example, even when passer 200 is difficult to take evasive behavior against vehicle 100, or even if the evasive behavior is delayed, the collision avoidance accuracy with vehicle 100 can be increased.

It should be noted that when an abnormal state is detected, comparator 52 may control the traveling direction of vehicle 100 in a direction deviating from the passer by, for example, outputting a control signal to steering 22C in addition to or in place of the brake control. According to the combination of the brake control and the steering control, the collision avoidance accuracy between passer 200 and vehicle 100 can be further enhanced.

Embodiment 2

Figure 8:
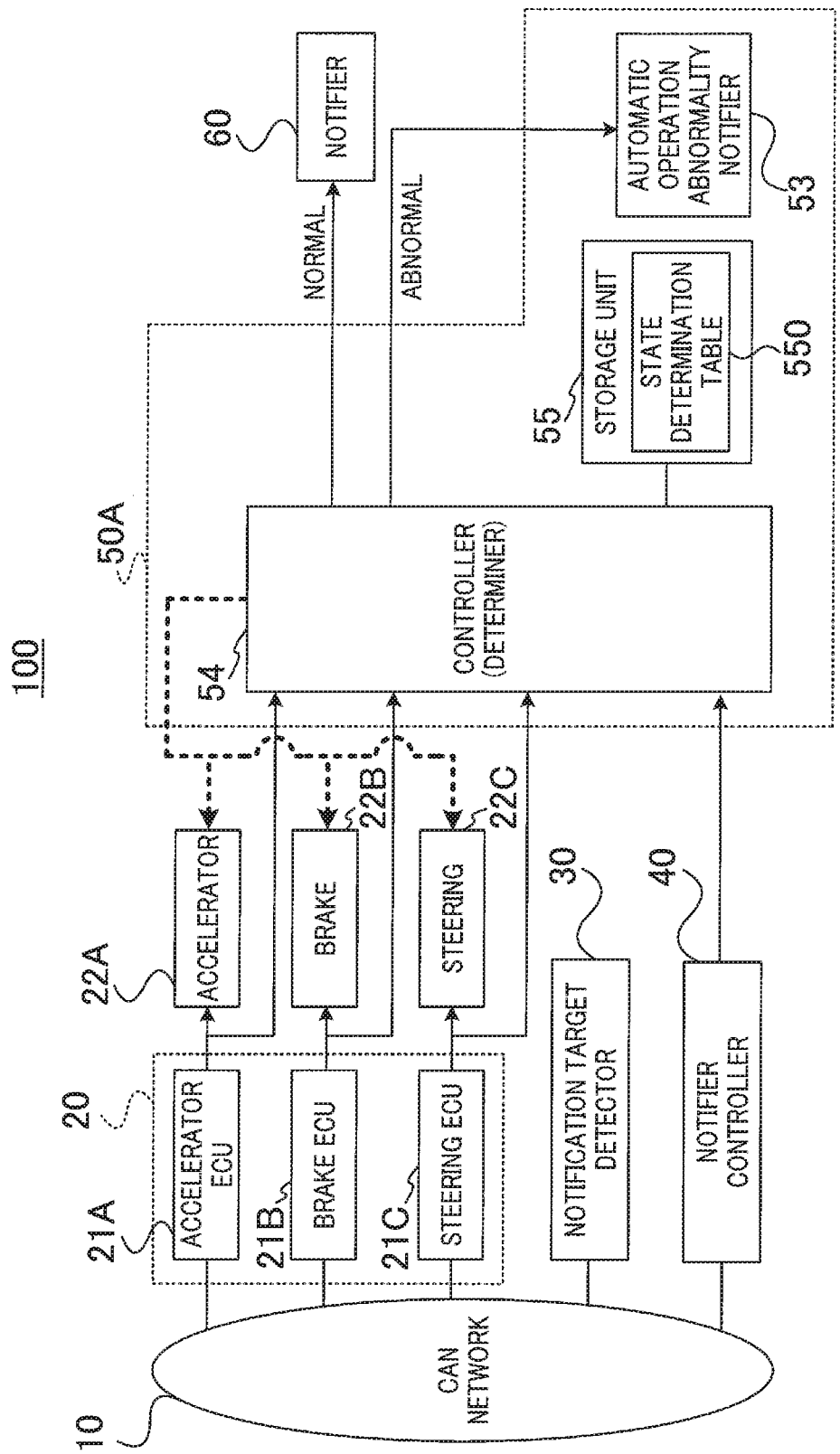
FIG. 8 is a block diagram illustrating an example of a configuration of a vehicle including an abnormality notifying apparatus according to Embodiment 2.

FIG. 8 is a block diagram illustrating an example of a configuration of vehicle 100 equipped with abnormality notifying apparatus 50A according to Embodiment 2.

Abnormality notifying apparatus 50A illustrated in FIG. 8 is different from abnormality notifying apparatus 50 illustrated in FIG. 1 in that a controller (or determiner) 54 and storage unit 55 are provided instead of the state determiners 51A and 51B and the comparator 52. In FIG. 8, a block denoted by the same reference numeral as that already described in FIG. 1 represents a block which is the same as or similar to the above-mentioned block unless otherwise noted.

Controller 54 determines whether or not there is a disagreement between the operating state and the notification state of vehicle 100 based on the state determination data as illustrated in FIG. 9, for example. The state determination data 550 illustrated in FIG. 9 illustratively has a data structure of and tabular format and may be referred to as state determination table 550 for the sake of convenience. State determination table 550 is stored in storage unit 55, for example.

In state determination table 550, information indicating the operating state of vehicle 100 (as non-limiting examples, acceleration value, brake value, and steering value) and notification content corresponding to (or associated with) the operating state of vehicle 100 may illustratively be registered.

For example, in a first column of state determination table 550, the operating state of vehicle 100, "during acceleration" or "during traveling" is correlated with (or associated with) displaying sign encouraging the passer to wait before traversing.

The state of vehicle 100 "acceleration or travelling", for example, may be defined or set as a case where acceleration value x satisfies "$a1 \leq x \leq a2$" and brake value y satisfies "$y=0$" (no brake operation). It should be noted that values "a1" and "a2" are real numbers satisfying $a1<a2$, and, for example, may be set to a value in a range that the acceleration value x can normally take during acceleration or travelling of vehicle 100. The value "a2" may be set to, for example, a legal speed. For steering value (z), "don't care" will do.

Further, in a second column of state determination table 550, the operating state of vehicle 100, "turning left or turning right" is correlated, for example, with (associated with) displaying an indication notifying that vehicle 100 is waiting for completion of traverse of a passer (display of vehicle standby).

The fact that vehicle 100 is "turning left or right turning" may be defined or set, for example, as a case where acceleration value x satisfies "a $3 \leq x \leq a\ 4$", the brake value y satisfies "$0 \leq y \leq b\ 1$" and the steering value z satisfies "s $1 \leq z \leq s\ 2$". It should be noted that the values "a3" and "a4" are positive real numbers that satisfy a3<a4, and may be set to values within a range where acceleration value x can normally take while vehicle 100 is turning left or turning right, for example. Also, the value "b1" is a positive real number and may be set to a value within a range where brake value y can normally take while vehicle 100 is turning left or turning right, for example. The values "s1" and "s2" are real numbers that satisfy s1<s2, and may be set to values within a range in which the steering value z can normally take while vehicle 100 is turning left or turning right, for example. Steering value z may take positive and negative values depending on the turning directions, that is, the left and the right, of steering 22C with reference to the straight traveling direction of vehicle 100.

Further, in a third column of state determination table 550, the operating state of vehicle 100, "decelerating", for example, is correlated with (or associated with) displaying a sign notifying that vehicle 100 is about to stop and encouraging a passer to wait without traversing until vehicle 100 stops (indication of notice of stop announcement).

The operating state of vehicle 100, "decelerating" may be defined or set as a case where acceleration value x satisfies "$0 \leq x \leq a5$", and brake value y satisfies "$b2 \leq y \leq b3$", for example. For steering value z, "don't care" will do. "a5" is a positive real number, and may be set to a value in a range where the acceleration value x can take during deceleration of vehicle 100, for example. "b2" and "b3" are real numbers that satisfy b2<b3, and may be set to a value within a range that brake value y can take during deceleration of vehicle 100, for example.

Also, in a fourth column of state determination table 550, the operating state of vehicle 100, "stopping" is correlated with (or associated with) displaying sign indicating that the passer can traverse, for example.

The operating state of vehicle 100, "stopping" may be defined or set as a case where acceleration value x=0", and brake value y satisfies "$b4 \leq y \leq b5$", for example. The values "b4" and "b5" are real numbers that satisfy b4<b5, and may be set to a value within a range that brake value y can take while vehicle 100 is stopping, for example.

The acceleration value may be, for example, a value of an air flow meter (or an air flow sensor) that senses the intake air amount of the engine, which changes according to the opening degree of the throttle valve. The brake value may be, for example, a value of a fluid pressure sensor (for example, a hydraulic pressure sensor) used for a brake actuator. The steering value may be, for example, a value of a torque sensor that senses a rotation amount of the steering torque.

The acceleration value, the brake value, and the steering value may be represented by an instantaneous value, an average value, or a time variation (difference). The acceleration value, the brake value, and the steering value may be values indicated by the accelerator control signal, the brake control signal, and the steering control signal output from ECUs 21A, 21B, and 21C, respectively.

Controller 54 determines whether the correspondence relationship between the acceleration value, the brake value, the steering value and the notification contents indicated by the notifier control signal is appropriate by referring to state determination table 550 described above. It should be noted that controller 54 may control at least one of accelerator 22A, brake 22B, and steering 22C based on the determination results using state determination table 550 as indicated by the dotted arrow in FIG. 8.

The data structure of state determination table 550 is not limited to the data structure shown in FIG. 9. For example, the number of columns of state determination table 550 may be increased or decreased according to the number of operating states of interest of vehicle 100. Further, the number of rows of the state determination table 550 may be increased or decreased according to the number items of control information (or sensor values) contributing to the operating state of interest, or the number of notification contents correlated with (or associated with) the operating. For example, a plurality of notification contents may be correlated with (or associated with) one operating state.

Operation Example

An example of the operation of vehicle 100 having abnormality notifying apparatus 50A according to Embodiment 2 will be described with reference to the flowchart of FIG. 10.

Figure 10:
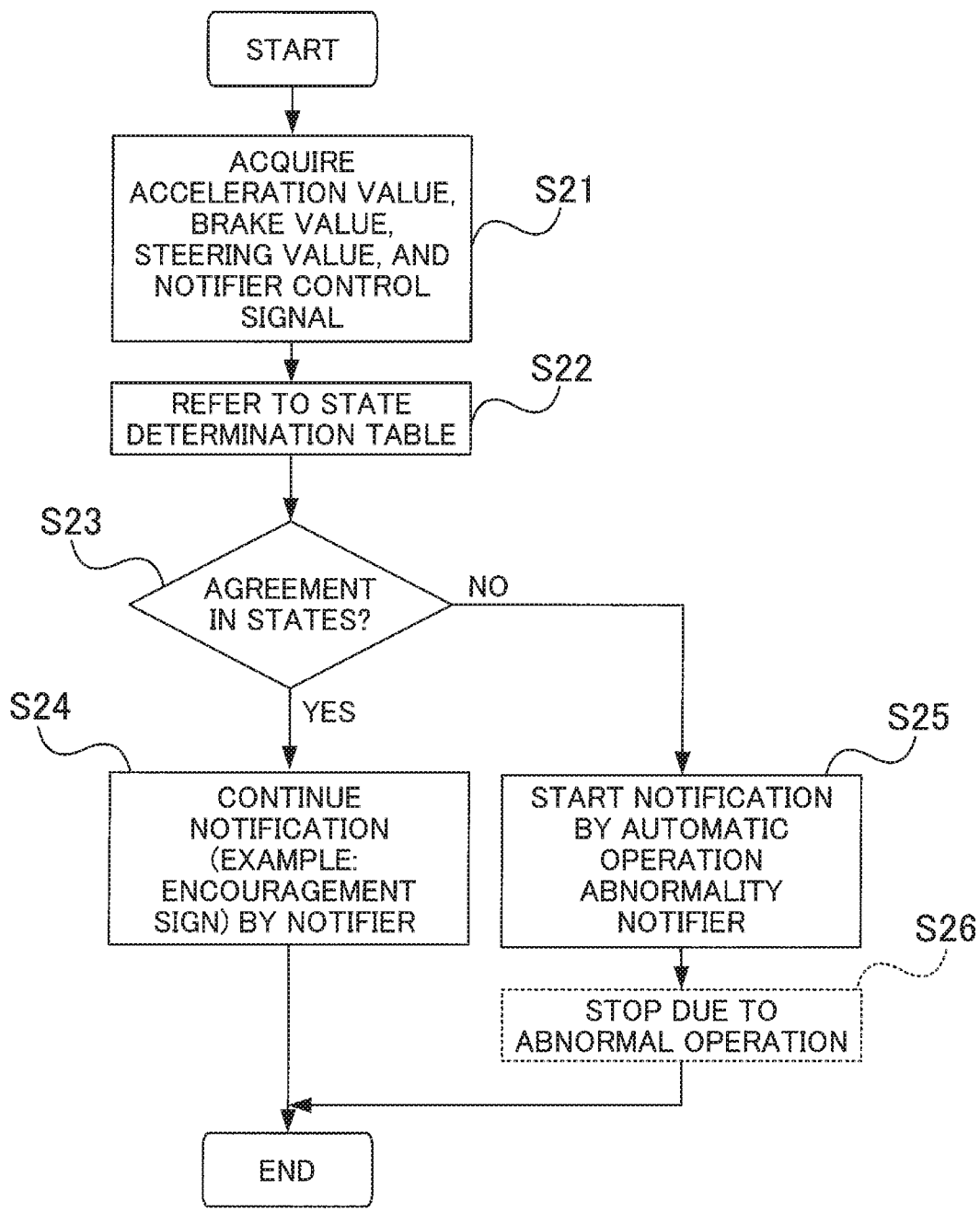
FIG. 10 is a flowchart illustrating an example of an operation of abnormality notifying apparatus according to Embodiment 2.

As illustrated in FIG. 10, for example, the abnormality notifying apparatus 50A acquires the acceleration value, the brake value, and the steering value and the notifier control signal output by notifier controller 40, in the controller 54 (S21).

Controller 54 refers to the state determination table 550 based on the acceleration value, the brake value, the steering value, and the notifier control signal (S22). Controller 54 then determines whether or not there is a disagreement in correspondence relationship between the operating states indicated by the acceleration value, the brake value and the steering value and the notification contents indicated by the notifier control signals (S23).

If correspondence relationship is in agreement (YES in S23), controller 54 determines that the state is "normal", and outputs, for example, a notifier control signal input from notifier controller 40 to notifier 60. Accordingly, notification (for example, guidance display for passer) by notifier 60 is continued (S24).

On the other hand, if there is a disagreement in operating state and the notification content (NO in S23), controller 54 determines that the state is "abnormal" and, for example, outputs a control signal for notifying an occurrence of abnormality to outside the vehicle (for example, passer) to automatic operation abnormality notifier 53 (S25). Automatic operation abnormality notifier 53 notifies that abnormality is occurring in automatic operation control of vehicle 100 to outside the vehicle according to a control signal given from controller 54.

Accordingly, for example, a passer in the vicinity of vehicle 100 can recognize that an abnormality is occurring in the automatic operation control of vehicle 100, so that the passer can take an evasive behavior such as not approaching vehicle 100. Therefore, for example, collision between cracked vehicle 100 and the passer can be avoided and safety of the passer around vehicle 100 can be improved.

It should be noted that the mode of the abnormality notification issued by automatic operation abnormality notifier 53 may be at least one of the modes described with reference to FIG. 4, FIG. 5, and FIG. 6 in Embodiment 1.

In addition, controller 54 may control (for example, stop control) the operating state of vehicle 100 according to abnormality notification issued by automatic operation abnormality notifier 53 as indicated by a dotted line in FIG. 10, for example (S26).

Also, since "disagreement in state" (abnormal state) is detected in controller 54, also when the notifier controller 40 out of the drive controller 20 and the notifier controller 40 is cracked, so that notification is issued by automatic operation abnormality notifier 53.

As described above, according to Embodiment 2 described above, controller 54 uses state determination table 550 to determine whether or not there is a disagreement between the operating state and the notification state of vehicle 100. Therefore, the configuration of abnormality notifying apparatus 50A can be simplified compared, for example, with Embodiment 1 described above. Furthermore, by using state determination table 550, time required for state determination can be shortened.

In addition, when changing (for example, adding or deleting) the correspondence relationship between the operating state and the notification contents of the vehicle is desired, it can be achieved by changing the data structure of state determination table 550. Therefore, flexibility and/or expandability for state determination can be improved compared to Embodiment 1.

For example, notification contents may be correlated with (or associated with) the operation direction (left direction or right direction) of steering 22C. Controller 54, for example, may determine or confirm whether or not the notification is performed in a correct direction in terms of positive or negative of the steering value (for example, the leftward direction if negative, and rightward direction if positive).

Controller 54 may achieve the above-described state determination, for example, by using the artificial intelligence (AI) technology such as machine learning or deep learning instead of, or in addition to, above-described state determination table 550. The deep learning may include, for example, a pattern recognition technique using a neural network.

<Others>

The above-described Embodiments 1 and 2 are examples in which abnormality notification is performed around vehicle 100 when there is a disagreement between the operation control and the notification control of vehicle 100. The destination of abnormality notification may be, for example, communication equipment outside vehicle 100.

For example, the destination of abnormality notification may be an in-vehicle communication equipment of other vehicles capable of performing inter-vehicle communication, a server that manages the infrastructure of road network, or a terminal apparatus.

The information to be notified or given to other vehicle, server, or terminal apparatus may include at least one of audio data, character data, and image data, for example.

Also, all or part of the various functions of abnormality notifying apparatuses 50 or 50A described above can be realized by a computer program.

A computer that realizes all or part of the various functions of abnormality notifying apparatus 50 or 50A described above by a program (hereinafter may be referred to as "abnormality notifying program") may include, illustratively, a processor, an input apparatus, an output apparatus, a memory, a storage, and a communication apparatus. These components are connected to a bus so that they can communicate with each other.

The processor is an example of a circuit or device with computing capability. For example, at least one of Central Processing Unit (CPU), Micro Processing Unit (MPU), and Graphics Processing Unit (GPU) may be used as the processor.

The input apparatus may include at least one of a keyboard, a mouse, a touch pad, an operation button, and a microphone, for example. Data or information may be entered into the processor via the input apparatus.

The output apparatus may include at least one of a display (or a monitor), a printer, and a speaker, for example. The display may be illustratively a touch panel display. The touch panel display can be regarded as corresponding to both input apparatus and output apparatus.

The memory stores, for example, a program executed by the processor and data or information processed in accordance with execution of the program. The memory may include a Random Access Memory (RAM) and a Read Only Memory (ROM). The RAM may be used for a work memory of the processor. The "program" may be referred to as "software" or "application".

The storage stores the program executed by the processor and the data or information processed in response to execution of program. The storage may include a semiconductor drive apparatus such as, for example, a hard disk drive (HDD) or a solid state drive (SSD). Additionally or alternatively to the semiconductor drive apparatus, a nonvolatile memory such as a flash memory may be included in the storage.

Storage unit 55 illustrated in FIG. 8 may be configured using, for example, the memory and/or the storage described above.

The program may include the abnormality notifying program described above. All or part of program code making up the abnormality notifying program may be stored in the memory and/or the storage or may be incorporated as part of an operating system (OS).

The program and/or data may be provided in a form recorded in a recording medium readable by the computer (processor). Examples of the recording medium include a flexible disk, a CD-ROM, a CD-R, a CD-RW, a MO, a DVD, a Blu-ray disk, and a portable hard disk. Also, a semiconductor memory such as USB (Universal Serial Bus) memory is also included in the examples of a recording medium.

In addition, the program and/or the data may be provided (downloaded) from a server to the computer via a communication line, for example. For example, the program and/or the data may be provided to the computer via the communication apparatus and stored in the memory and/or the storage. Also, the program and/or the data may be provided to the computer via the input apparatus and stored in the memory and/or the storage.

The communication apparatus may include, for example, a wireless or wired communication interface (IF). The wireless communication IF may be, for example, a communication IF for inter-vehicle communication and/or road-to-vehicle communication.

Each functional block used for explaining the above-mentioned embodiments is realized as an LSI which is typically an integrated circuit. These functional blocks may be separately formed into individual chips, or may be formed into one chip to include all or some of these functional blocks. In this case, an appellation "LSI" is employed. However, depending on the degree of integration, appellations such as IC, system LSI, super LSI, ultra LSI may be employed.

In addition, the technique of circuit integration is not limited to the LSI, and it may be realized by a dedicated circuit or a general-purpose processor. A Field Programmable Gate Array (FPGA) that can be programmed after LSI fabrication or a reconfigurable processor that can reconfigure connections and settings of circuit cells inside the LSI may be used.

Furthermore, if technologies of integrated circuits replacing LSIs appear owing to advances in semiconductor technology or other derived technologies, it is of course possible to integrate functional blocks using that technology. Application of biotechnology may be one of possibilities.

Summary of Disclosure

An abnormality notifying apparatus according to this disclosure includes: a determiner that determines whether or not there is a disagreement in correspondence relationship between operation control and notification control based on a first signal related to the operation control of a vehicle and a second signal related to the notification control for notifying notification information according to the operation control to outside the vehicle; and a notifier that notifies information indicating that the vehicle is in an abnormal state to outside the vehicle when there is a disagreement in correspondence relationship.

In the abnormality notifying apparatus of this disclosure, the determiner determines that there is a disagreement in correspondence relationship when the first signal indicates the operation control for allowing the vehicle to travel, and the second signal indicates the notification control to be performed when the vehicle decelerates or stops.

In the abnormality notifying apparatus of this disclosure, the first signal is a control signal or a sensor value related to at least one of an accelerator, a brake and a steering of the vehicle, and the notification information is associated with the operation control indicated by one or a plurality of combinations of the control signal or the sensor value.

In the abnormality notifying apparatus of this disclosure, the determiner performs control for stopping notification of the notification information according to the operating state when there is a disagreement in correspondence relationship.

In the abnormality notifying apparatus of this disclosure, the determiner outputs a control signal to control target of the operation control for stopping the vehicle when there is a disagreement in correspondence relationship.

In the abnormality notifying apparatus of this disclosure, the notifier notifies information indicating that the vehicle is in an abnormal state to outside the vehicle by an alarm sound.

In the abnormality notifying apparatus of this disclosure, the notifier notifies information indicating that the vehicle is in the abnormal state to outside the vehicle by displaying the information indicating that the vehicle is in the abnormal state.

In the abnormality notifying apparatus of this disclosure, the determiner outputs a control signal to control target of the operation control for controlling a traveling direction of the vehicle to a direction deviated from a passer when there is a disagreement in correspondence relationship.

In the abnormality notifying apparatus of this disclosure, the notifier notifies information indicating that the vehicle is in an abnormal state to a communication equipment outside the vehicle when there is a disagreement in correspondence relationship.

In the abnormality notifying apparatus of this disclosure, the information indicating that the vehicle is in the abnormal state includes at least one of audio data, character data, and image data.

In the abnormality notifying apparatus of this disclosure, the communication equipment is an in-vehicle communication equipment of another vehicle capable of performing inter-vehicle communication.

In the abnormality notifying apparatus of this disclosure, the communication equipment is a server that manages an infrastructure of a road network.

In the abnormality notifying apparatus of this disclosure, the communication equipment is a terminal apparatus.

In the abnormality notifying apparatus of this disclosure, the determiner determines whether or not there is a disagreement in correspondence relationship between the operation control and the notification control based on previously stored information indicating the correspondence relationship between the operation control and the notification control.

In the abnormality notifying apparatus of this disclosure, the information indicating the correspondence relationship between the operation control and the notification control has a data structure in a tabular format.

An abnormality notifying apparatus according to this disclosure further includes a storage that stores information indicating the correspondence relationship between the operation control and the notification control.

In the abnormality notifying apparatus of this disclosure, the determiner determines whether or not there is a disagreement in correspondence relationship between the operation control and the notification control by artificial intelligence.

A vehicle in this disclosure includes: an abnormality notifying apparatus described above.

An abnormality notifying method of this disclosure includes: determining whether or not there is a disagreement in correspondence relationship between operation control and notification control based on a first signal related to the operation control of a vehicle and a second signal related to the notification control for notifying notification information according to the operation control to outside the vehicle; and notifying information indicating that the vehicle is in an abnormal state to outside the vehicle when there is a disagreement in correspondence relationship.

A non-transitory recording medium including a program of this disclosure recorded therein includes a program for causing a computer to execute processes of: determining whether or not there is a disagreement in correspondence relationship between operation control and notification control based on a first signal related to the operation control of a vehicle and a second signal related to the notification control for notifying notification information according to the operation control to outside the vehicle; and a process of notifying information indicating that the vehicle is in an abnormal state to outside the vehicle when there is a disagreement in correspondence relationship.

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2018-062868, filed on Mar.

28, 2018, the disclosure of which including the specification, drawings and abstract is incorporated herein by reference in its entirety.

INDUSTRIAL APPLICABILITY

This disclosure is suitable for, for example, an apparatus or a system that notifies a notification target information according to an operating state of a vehicle.

REFERENCE SIGNS LIST

10 CAN
20 Drive controller
21A Accelerator ECU
21B Brake ECU
21C Steering ECU
22A Accelerator
22B Brake
22C Steering
30 Notification target detector
40 Notifier controller
50, 50A Abnormality notifying apparatus
51A State determiner
51B State determiner
52 Comparator
53 Automatic operation abnormality notifier (notifier)
54 Controller (Determiner)
55 Storage unit
60 Notifier
550 State determination table

The invention claimed is:

1. An abnormality notifying apparatus, comprising:
a determiner that determines whether or not there is a disagreement in correspondence relationship between operation control and notification control based on a first signal related to the operation control of a vehicle and a second signal related to the notification control for notifying notification information according to the operation control to outside the vehicle; and
a notifier that notifies information indicating that the vehicle is in an abnormal state to outside the vehicle when there is the disagreement in the correspondence relationship,
wherein the determiner determines that there is the disagreement in the correspondence relationship in a case where content of the notification information, which is based on the notification control according to the second signal, indicates that it is dangerous for a passer when the vehicle travel is based on the operation control according to the first signal, and
wherein the determiner performs control for stopping notification of the notification information according to the operation control when there is the disagreement in the correspondence relationship.

2. The abnormality notifying apparatus according to claim 1, wherein the determiner determines that there is the disagreement in the correspondence relationship in a case where the first signal indicates the operation control for allowing the vehicle to travel and the second signal indicates the notification control for decelerating or stopping the vehicle.

3. The abnormality notifying apparatus according to claim 1, wherein
the first signal is a control signal or a sensor value related to at least one of an accelerator, a brake and a steering of the vehicle, and
the notification information is associated with the operation control indicated by one or a plurality of combinations of the control signal or the sensor value.

4. The abnormality notifying apparatus according to claim 1, wherein the determiner outputs a control signal for stopping the vehicle to a control target of the operation control, when there is the disagreement in the correspondence relationship.

5. The abnormality notifying apparatus according to claim 1, wherein the notifier notifies information indicating that the vehicle is in the abnormal state to outside the vehicle by a n alarm sound.

6. The abnormality notifying apparatus according to claim 1, wherein the notifier notifies information indicating that the vehicle is in the abnormal state to outside the vehicle by displaying the information indicating that the vehicle is in the abnormal state.

7. The abnormality notifying apparatus according to claim 1, wherein the determiner outputs a control signal for controlling a traveling direction of the vehicle to be a direction deviated from the passer to a control target of the operation control, when there is the disagreement in the correspondence relationship.

8. The abnormality notifying apparatus according to claim 1, wherein the notifier notifies information indicating that the vehicle is in the abnormal state to communication equipment outside the vehicle when there is the disagreement in the correspondence relationship.

9. The abnormality notifying apparatus according to claim 8, wherein the information indicating that the vehicle is in the abnormal state includes at least one of audio data, character data, and image data.

10. The abnormality notifying apparatus according to claim 8, wherein the communication equipment is in-vehicle communication equipment of another vehicle capable of performing inter-vehicle communication.

11. The abnormality notifying apparatus according to claim 8, wherein the communication equipment is a server that manages an infrastructure of a road network.

12. The abnormality notifying apparatus according to claim 8, wherein the communication equipment is a terminal apparatus.

13. The abnormality notifying apparatus according to claim 1, wherein the determiner determines whether or not there is the disagreement in correspondence relationship between the operation control and the notification control based on previously stored information indicating a correspondence relationship between the operation control and the notification control.

14. The abnormality notifying apparatus according to claim 13, wherein the stored information indicating the correspondence relationship between the operation control and the notification control has a data structure in a tabular format.

15. The abnormality notifying apparatus according to claim 13, further comprising a storage unit that stores the stored information indicating the correspondence relationship between the operation control and the notification control.

16. The abnormality notifying apparatus according to claim 1, wherein the determiner determines whether or not there is the disagreement in correspondence relationship between the operation control and the notification control by artificial intelligence.

17. An abnormality notifying method, comprising:
determining whether or not there is a disagreement in correspondence relationship between operation control and notification control based on a first signal related to the operation control of a vehicle and a second signal related to the notification control for notifying notification information according to the operation control to outside the vehicle;

determining that there is the disagreement in the correspondence relationship in a case where content of the notification information, which is based on the notification control according to the second signal, indicates that it is dangerous for a passer when the vehicle travel is based on the operation control according to the first signal;

notifying information indicating that the vehicle is in an abnormal state to outside the vehicle when there is the disagreement in the correspondence relationship; and performing control for stopping notification of the notification information according to the operation control when there is the disagreement in the correspondence relationship.

18. A non-transitory recording medium recording therein a computer program causing a processor to execute processing comprising:

determining whether or not there is a disagreement in correspondence relationship between operation control and notification control based on a first signal related to the operation control of a vehicle and a second signal related to the notification control for notifying notification information according to the operation control to outside the vehicle;

determining that there is the disagreement in the correspondence relationship in a case where content of the notification information, which is based on the notification control according to the second signal, indicates that it is dangerous for a passer when the vehicle travel is based on the operation control according to the first signal;

notifying information indicating that the vehicle is in an abnormal state to outside the vehicle when there is the disagreement in the correspondence relationship; and performing control for stopping notification of the notification information according to the operation control when there is the disagreement in the correspondence relationship.

* * * * *